(12) United States Patent
Miyoshi et al.

(10) Patent No.: US 11,628,876 B2
(45) Date of Patent: Apr. 18, 2023

(54) VEHICLE STEERING DEVICE AND ASSEMBLING METHOD THEREOF

(71) Applicant: HONDA MOTOR CO., LTD., Tokyo (JP)

(72) Inventors: Takashi Miyoshi, Tokyo (JP); Tsutomu Tatsuishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/680,516

(22) Filed: Feb. 25, 2022

(65) Prior Publication Data

US 2022/0297739 A1 Sep. 22, 2022

(30) Foreign Application Priority Data

Mar. 18, 2021 (JP) .............................. JP2021-044310

(51) Int. Cl.
| | | |
|---|---|---|
| *B62D 1/16* | (2006.01) | |
| *F16D 1/08* | (2006.01) | |
| *F16D 3/78* | (2006.01) | |

(52) U.S. Cl.
CPC ............. *B62D 1/16* (2013.01); *F16D 1/0864* (2013.01); *F16D 3/78* (2013.01)

(58) Field of Classification Search
None
See application file for complete search history.

(56) References Cited

U.S. PATENT DOCUMENTS

| | | | | |
|---|---|---|---|---|
| 7,445,242 B2 * | 11/2008 | Yamaguchi | ............... | F16D 3/78 |
| | | | | 280/779 |
| 10,315,685 B2 * | 6/2019 | Assmann | ................ | F16D 3/387 |
| 11,035,414 B2 * | 6/2021 | Moriyama | ................ | F16D 1/04 |

FOREIGN PATENT DOCUMENTS

| | | | | | |
|---|---|---|---|---|---|
| CN | 111065835 A | * | 4/2020 | ............... | B62D 1/20 |
| CN | 113167330 A | * | 7/2021 | ............... | F16C 3/02 |
| JP | S58-164971 U | | 11/1983 | | |
| JP | 2005-280564 A | | 10/2005 | | |
| JP | 2008-132845 A | | 6/2008 | | |
| JP | 2011-173463 A | | 9/2011 | | |
| JP | 2014-024473 A | | 2/2014 | | |

OTHER PUBLICATIONS

JP2008132845A Translation (Year: 2008).*
Japanese Office Action received in corresponding Japanese application No. 2021-044310 dated Sep. 13, 2022 with English translation (8 pages).

\* cited by examiner

*Primary Examiner* — Faye M Fleming
(74) *Attorney, Agent, or Firm* — Rankin, Hill & Clark LLP

(57) ABSTRACT

A vehicle steering device includes a positioning clip configured to align a pinion shaft with a joint portion of a steering shaft, wherein the pinion shaft includes a torsion bar and a tubular member having the torsion bar inserted thereinto, an upper end of the torsion bar is axially further away from the joint portion than an upper end of the tubular member, the positioning clip includes an inserted portion to be inserted into the tubular member, and a gap between the inserted portion and the tubular member is sealed.

6 Claims, 4 Drawing Sheets

VEHICLE STEERING DEVICE AND ASSEMBLING METHOD THEREOF

CROSS-REFERENCE TO RELATED APPLICATION

This application claims the benefit of priority to Japanese Patent Application No. 2021-044310 filed on Mar. 18, 2021, the disclosures of all of which are hereby incorporated by reference in their entireties.

TECHNICAL FIELD

The present invention relates to a vehicle steering device and an assembling method thereof.

BACKGROUND OF THE INVENTION

A conventional steering device has been known to have a phase determination clip (or positioning clip) at an upper end of a pinion shaft provided in a steering gear box (see Japanese Application Publication No. 2005-280564 A (hereinafter, referred to as Patent Document 1), for example). The pinion shaft includes a hollow shaft body, and a torsion bar arranged in a hollow portion of the shaft body and having a head portion sticked from a top end of the shaft body. The positioning clip includes a lower annular portion to be splined to an outer circumference of an upper end of the shaft body, and an upper annular portion to be fitted onto the head portion of the torsion bar. The positioning clip is attached to the upper end of the pinion shaft with these annular portions. The positioning clip also has an engagement portion in an arm shape to engage an end (joint portion) of a steering shaft extending downward from a driving wheel at a predetermined rotational phase around an axis of rotation. According to such a steering device, when the series of steering shafts is connected with the pinion shaft, the positioning clip facilitates aligning the predetermined phases of these shafts.

SUMMARY

Meanwhile, a conventional steering device (see Patent Document 1, for example) may be required to shorten the length of the torsion bar, based on a recent requirement of reducing an environmental load, to reduce a vehicle body in weight. However, assuming that a pinion shaft of the conventional steering device has a torsion bar shortened, the pinion shaft results in having a space inside thereof, in proportion to shortening of the torsion bar. In addition, the pinion shaft has no head of the torsion bar, at the upper end thereof, for support the upper annular portion of the positioning clip, and instead has an opening open to the hollow portion thereof. Such a steering device has a risk of having insufficient support strength at an upper portion of the positioning clip, and a risk of the pinion shaft being rusted due to water entering thereinto through the opening.

The present invention is intended to provide a vehicle steering device to achieve in reducing a vehicle body in weight, to have superior support strength of a positioning clip, and to prevent a pinion shaft from being rusted, and an assembling method thereof.

A vehicle steering device, for resolving the above-identified problem, includes: a pinion shaft provided in a steering gear box; a joint portion of a steering shaft coupled with the pinion shaft; a positioning clip configured to align the pinion shaft with the joint portion, wherein the pinion shaft includes a torsion bar and a tubular member having the torsion bar inserted thereinto, an upper end of the torsion bar is axially further away from the joint portion than an upper end of the tubular member, the positioning clip includes an inserted portion to be inserted into the tubular member, and a gap between the inserted portion and the tubular member is sealed. In addition, an assembling method of a vehicle steering device is an assembling method of the vehicle steering device described above and includes: aligning a rotational phase of the positioning clip about an axis of the pinion shaft by placing the positioning clip to a mark formed in an end surface of the tubular member; and engaging the positioning clip with the tubular member after the aligning.

The present invention provides a vehicle steering device to achieve in reducing a vehicle body in weight, to have superior support strength of the positioning clip with respect to the pinion shaft, and to prevent the pinion shaft from being rusted, and an assembling method thereof.

DETAILED DESCRIPTION

<Steering Device>

Figure 1:
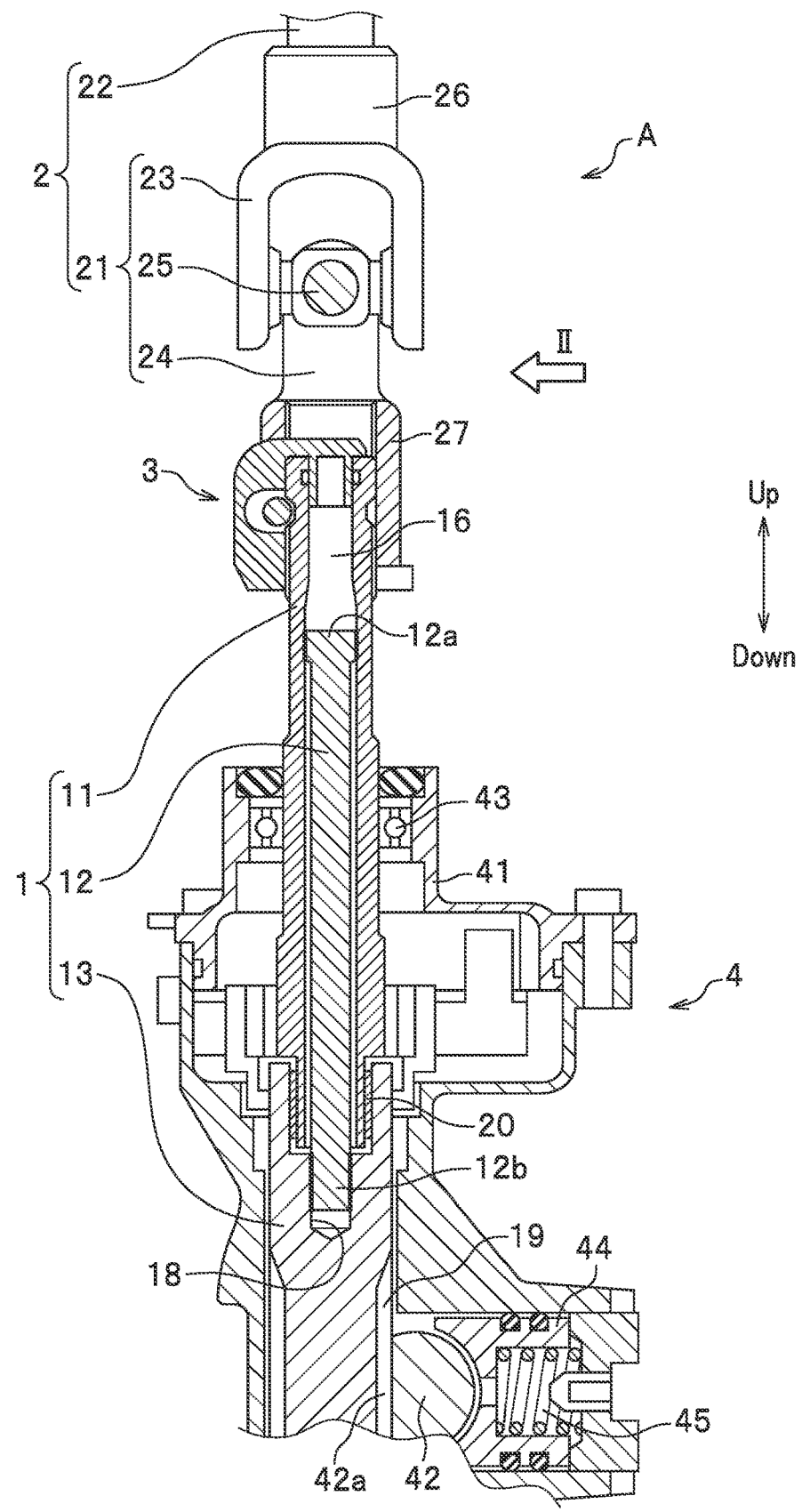
FIG. 1 is a vertical cross-sectional view of a vehicle steering device according to an embodiment of the present invention.

Hereinbelow, a description is given of a vehicle steering device and an assembling method thereof according to an embodiment of the present invention, with reference to the drawings as required. FIG. 1 is a vertical cross-sectional view of a steering device A according to the present embodiment. An up-down direction in the following description is based on an up-down direction indicated by an arrow in FIG. 1 which is aligned with an up-down direction of a vehicle. As shown in FIG. 1, the steering device A includes: a pinion shaft 1 arranged in a steering gear box 4; a steering shaft 2 extending downward from a driving wheel (not shown); and a positioning clip 3.

The pinion shaft 1 includes: a tubular member 11 as an input shaft; a torsion bar 12 inserted into a hollow portion 16 of the tubular member 11; and an output shaft 13 extending under the tubular member 11 so as to be coaxial with the tubular member 11. The tubular member 11 extends in an up-down direction through a housing 41 of the steering gear box 4, partly extending upward out of the housing 41. An upper end of the tubular member 11 is coupled at a coupling portion with a lower end of the steering shaft 2 (joint 21). The coupling portion is described below in detail.

The torsion bar 12 is a bar-like member to cause the tubular member 11 and the output shaft 13 to have a relative torsional displacement therebetween. The steering device A reduces a steering torque by an assist torque generated by a motor (not shown) based on the relative torsional displacement. An upper end of the torsion bar 12 is axially further away from the joint 21 than the upper end of the tubular member 11. That is, the tubular member 11 of the present embodiment has the hollow portion 16, having no part of the torsion bar 12 to be inserted therein, remained at least in a portion thereof extending out of the housing 41.

A head 12a, as an upper end of the torsion bar 12, has a peripheral surface thereof knurled, although not shown. The head 12a of the torsion bar 12 is press-fitted into the inner circumference of the tubular member 11, so as to be joined with the tubular member 11 (knurled press-fit joining). Incidentally, the head 12a is joined to the tubular member 11, assumingly by the knurled press-fit joining in the present embodiment, but it is not limited thereto and a different press-fit joining may be used. Additionally, joining of the tubular member 11 with the head 12a is not limited to press-fit joining and a different mechanical joining may be used.

Likewise, a lower end 12b of the torsion bar 12 is press-fitted into a torsion bar insertion hole 18 formed in the output shaft 13, so as to be joined with the output shaft 13. Incidentally, press-fit joining of the lower end 12b of the torsion bar 12 with respect to the torsion bar insertion hole 18 is assumed to use the knurled press-fit joining in the present embodiment, but it is not limited thereto and different press-fit joining may be used. Additionally, joining of the output shaft 13 with the lower end 12b of the torsion bar 12 is not limited to press-fit joining and a different mechanical joining may be used. The output shaft 13 is formed, at a lower portion thereof, with a pinion 19. The pinion 19 is meshed with a rack 42a formed in a rack shaft 42 extending in a vehicle width direction (front-back direction of a plane of paper in FIG. 1). Note that a reference sign 20 in FIG. 1 indicates a roller bearing between the tubular member 11 and the output shaft 13. A reference sign 43 indicates a bearing to support the pinion shaft 1 in the housing 41. A reference sign 45 indicates a compressed spring biasing a rack guide 44 toward the rack 42a.

Figure 2:
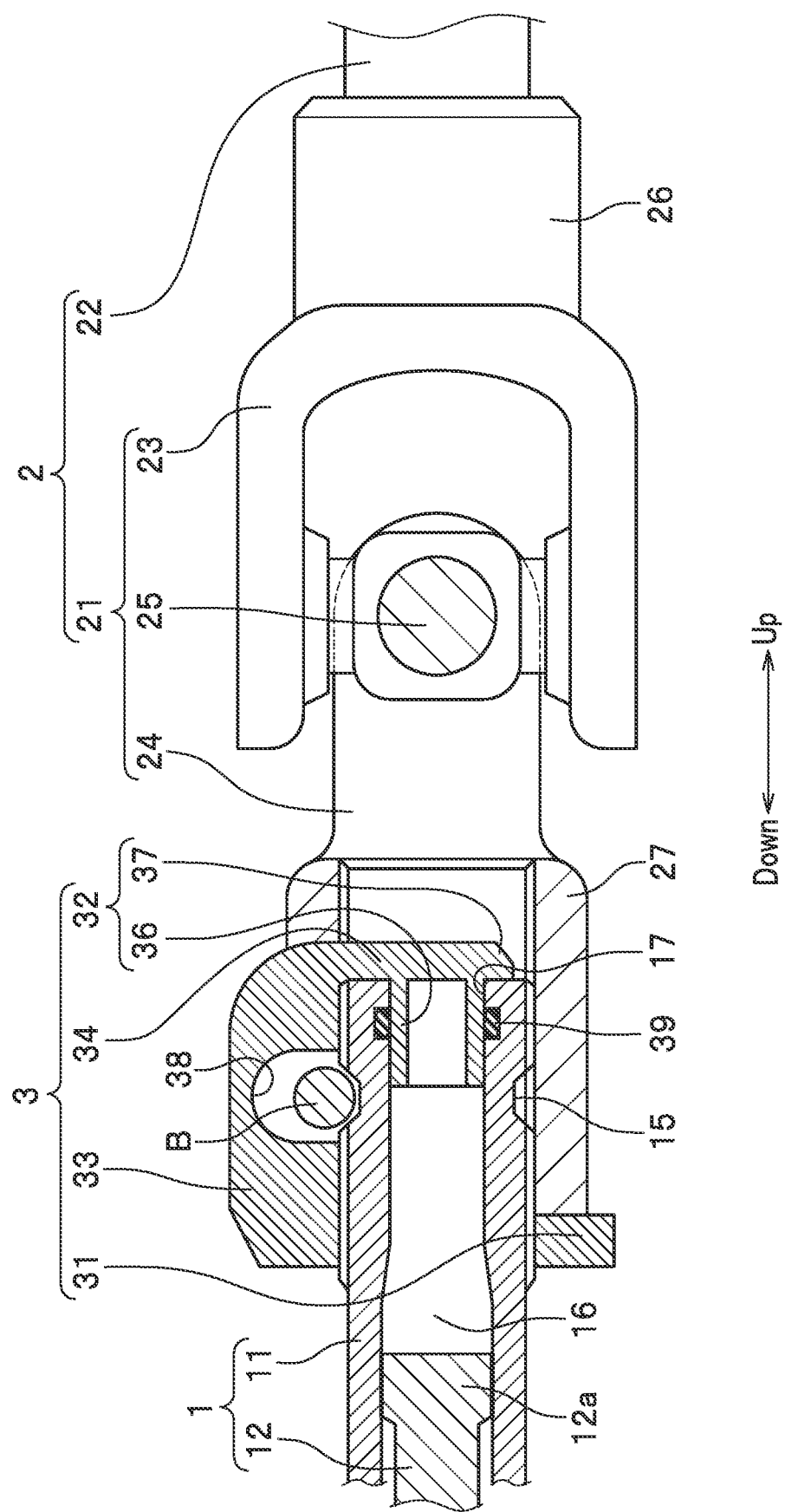
FIG. 2 is a partially enlarged view of a portion indicated by an open arrow II in FIG. 1.

FIG. 2 is a partially enlarged view of a portion indicated by an open arrow II in FIG. 1. The steering shaft 2 is provided, at a lower end thereof, with a joint portion 21 connecting with an upper end of the pinion shaft 1, as shown in FIG. 2. The joint portion 21 comprises a universal joint, with an upper half 23 in a U-shape coupled with a lower half 24 via a cross pin 25. The upper half 23 includes an upper cylinder 26 fixed to a shaft 22 of the steering shaft 2. The lower half 24 includes a lower cylinder 27 open downward.

Figure 3:
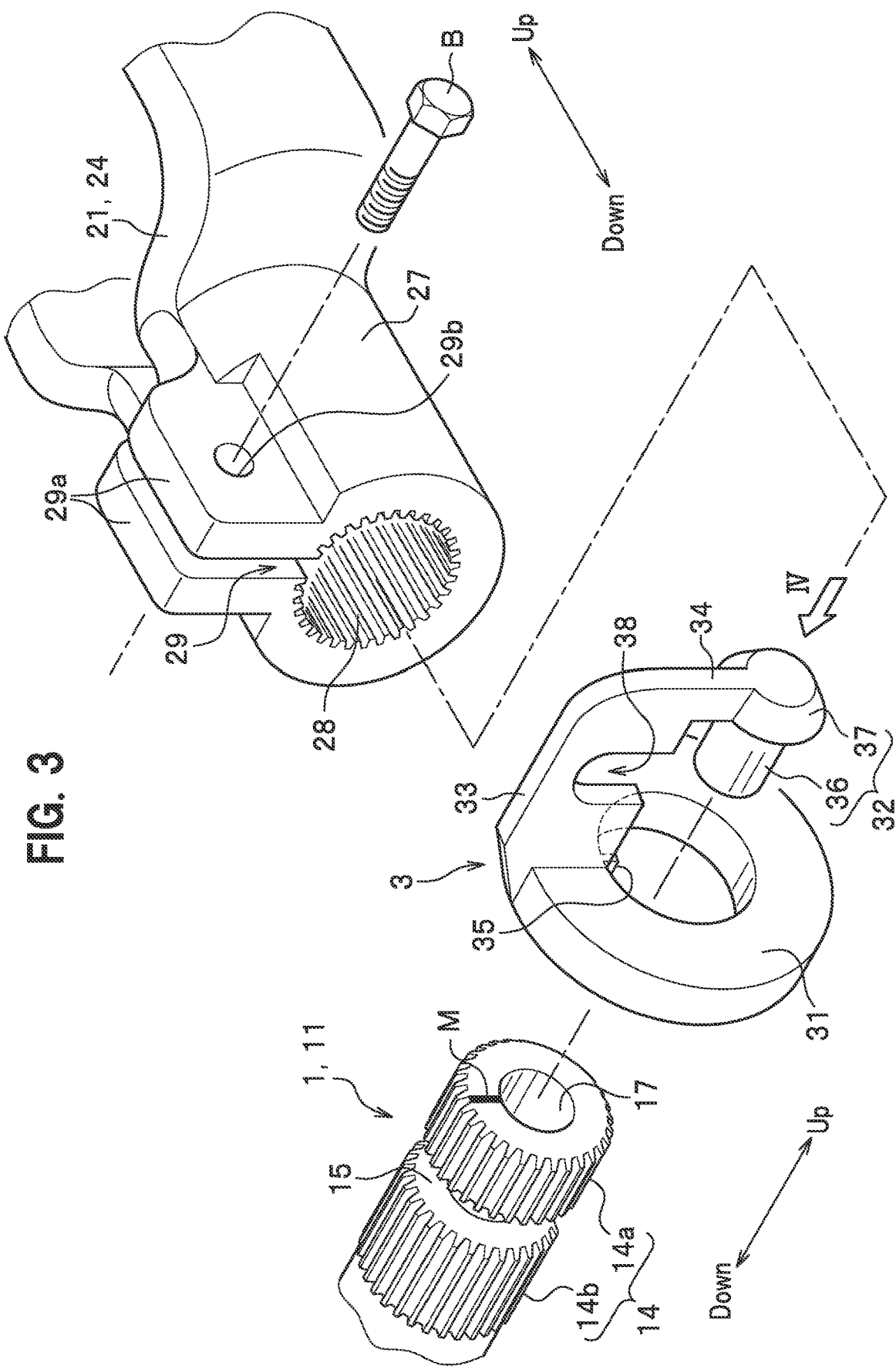
FIG. 3 is an exploded perspective view of a coupling portion between a steering shaft and a pinion shaft in FIG. 2.

Next, the lower half 24 of the joint portion 21 is more specifically described in shape, with a shape of an upper portion of the pinion shaft 1. FIG. 3 is an exploded perspective view of the coupling portion between the steering shaft 2 and the pinion shaft 1 in FIG. 2. As shown in FIG. 3, the upper portion of the pinion shaft 1 only includes the tubular member 11. The tubular member 11 is formed, on an upper end surface thereof, with an opening 17 of the hollow portion 16 (see FIG. 1). In addition, the upper end surface of the tubular member 11 has a mark M scribed therein, as a guide in the form of a line. The mark M is described below in detail.

The tubular member 11 is formed, in an upper outer periphery thereof, with a spline 14 extending in the axis direction. Additionally, the tubular member 11 is formed, on the upper outer periphery, with a circumferential groove 15 so as to split the spline 14 between an upper portion 14a and a lower portion 14b.

In response to this configuration, the lower cylinder 27 of the joint portion 21 (lower half 24) is formed, in an inner periphery thereof, with a spline 28 so as to correspond to the spline 14. The lower half 24 and the pinion shaft 1 engage with each other, with the splines 14, 28 interdigitated with each other, so as to have a rotational phase thereof about the axis fixed. This causes a steering angle of the driving wheel (not shown) to be associated with a steering angle of a steering wheel (not shown).

The lower cylinder 27 as described above is formed with a slit 29, through which a plate-like joint engagement portion 33 of the positioning clip 3 to be described below is inserted, so as to extend in the axial direction. Additionally, the lower cylinder 27 is formed with a pair of facing-each-other walls 29a across the slit 29. In particular, the pair of facing-each-other walls 29a are formed of a pair of plates protruding outward in a radial direction of the lower cylinder 27 from both ends in a circumferential direction of the lower cylinder 27 across the slit 29. The pair of facing-each-other walls 29a are each formed with an insertion hole 29b for a bolt B. The pair of facing-each-other walls 29a holds the joint engagement portion 33 of the positioning clip 3 (to be described below), to be inserted into the slit 29, and fixes the positioning clip 3 to the lower cylinder 27 by the bolt B meshed with the threaded insertion holes 29b. Note that the bolt B may be meshed with an additionally provided nut, although not shown, in addition to being inserted into the pair of facing-each-other walls 29a, to fasten the pair of facing-each-other walls 29a with each other so as to hold the joint engagement portion 33 in between.

Next, the positioning clip 3 is described. The positioning clip 3 of the present embodiment is assumed to be molded from synthetic resin, but may be formed of another material such as metal. As shown in FIG. 3, the positioning clip 3 includes: an annular portion 31 assembled onto an outer periphery of the tubular member 11; an inserted portion 32 inserted into the hollow portion 16 (see FIG. 2) of the tubular member 11 through the opening 17 of the tubular member 11; the joint engagement portion 33 engaged with the lower cylinder 27 (joint portion 21); and an arm portion 34 coupling the inserted portion 32 with the joint engagement portion 33.

The annular portion 31 has an inner diameter thereof set to one to allow for being inserted onto the tubular member 11 of the pinion shaft 1. In particular, the inner diameter of the annular portion 31 is set to an outer diameter of meshes of the spline 14 of the tubular member 11, so as to allow the annular portion 31 to be slid along the axial direction of the tubular member 11. In addition, the annular portion 31 has a spline-fit portion 35 formed in an inner periphery thereof so as to be engaged with (a keyway of) the spline 14 of the tubular member 11. The spline-fit portion 35 of the present embodiment is assumed to be a rail-like key protruding radially inward from the inner periphery of the annular portion 31 and extending in the axial direction.

Note that the spline-fit portion 35 of the present embodiment is assumed to be provided at a single circumferential location of the annular portion 31 so as to correspond to a location of the annular portion 31 joined with the joint engagement portion 33. However, the spline-fit portion 35 may be provided at two or more circumferential locations of the annular portion 31. Additionally, the two or more spline-fit portions 35 may be formed continuously all over the inner periphery of the annular portion 31, to have a spline structure interdigitating with the spline 14.

The inserted portion 32 is arranged so as to be coaxial with the axis of the annular portion 3, as shown in FIG. 3. The inserted portion 32 described above includes an inserted body 36 to be accommodated in the hollow portion 16 (see FIG. 2) of the tubular member 11, and a flange 37 formed at an upper end of the inserted body 26. The inserted body 36 of the present embodiment is assumed to be formed of a bottomed cylindrical body open downward. The inserted body 36 is inserted into the hollow portion 16 of the tubular member 11, as shown in FIG. 2, to seal a gap between the inserted body 36 and the tubular member 11. Note that the present embodiment has an O-ring 39 interposed between the inserted body 36 and the tubular member 11, but the O-ring 39 may be omitted, with a sealant applied between the inserted body 36 and the tubular member 11, for example. The flange 37 has a wider diameter than the inserted body 36, as shown in FIG. 2, to effectively cover the opening 17 of the tubular member 11.

The joint engagement portion 33 is formed of an elongated plate rising from an upper end surface of the annular portion 31, as shown in FIG. 3. In particular, the joint engagement portion 33 is formed of a plate having a thickness corresponding to a gap between the pair of facing-each-other walls 29a of the lower cylinder 27. The joint engagement portion 33 is joined to the annular portion 31 along a line in a radial direction of the annular portion 31. This allows the joint engagement portion 33 to engage with the lower cylinder 27 at a predetermined rotational phase about the axis with respect to the lower cylinder 27, when held between the pair of facing-each-other walls 29a of the lower cylinder 27.

The arm portion 34 is formed to be unified with an upper part of the joint engagement portion 33, as shown in FIG. 3. In particular, the arm portion 34 extends inward in the radial direction of the annular portion 31 from the joint engagement portion 33, so as to have a substantially L-shape along with the joint engagement portion 33, and is connected to the flange 37 of the inserted portion 32.

The positioning clip 3 as described above is formed with a cut-off portion 38 through which the bolt B is to be inserted. The cut-off portion 38 is formed in the joint engagement portion 33 so as to correspond to the circumferential groove 15 of the tubular member 11, as shown in FIG. 2, when the steering shaft 2 is coupled with the pinion shaft 1 by way of an assembling method to be described below.

<Assembling Method of Steering Device>

Next, a description is given of an assembling method of the steering device A (see FIG. 1) according to the present embodiment. With this assembling method, the positioning clip 3 (see FIG. 1) is first attached to the upper portion of the tubular member 11 (see FIG. 1) extending upward out of the steering gear box 4 (see FIG. 1). At this time, the positioning clip 3 (see FIG. 1) is attached to the tubular member 11 (see FIG. 1) of the pinion shaft 1 (see FIG. 1) at a predetermined phase, with the right and left steering wheels (not shown) set to neutral positions to have the pinion shaft 1 (see FIG. 1) neutrally positioned. When the attachment is made, the tubular member 11 has the line-shaped mark M scribed in the upper end surface thereof, as shown in FIG. 3.

Figure 4:
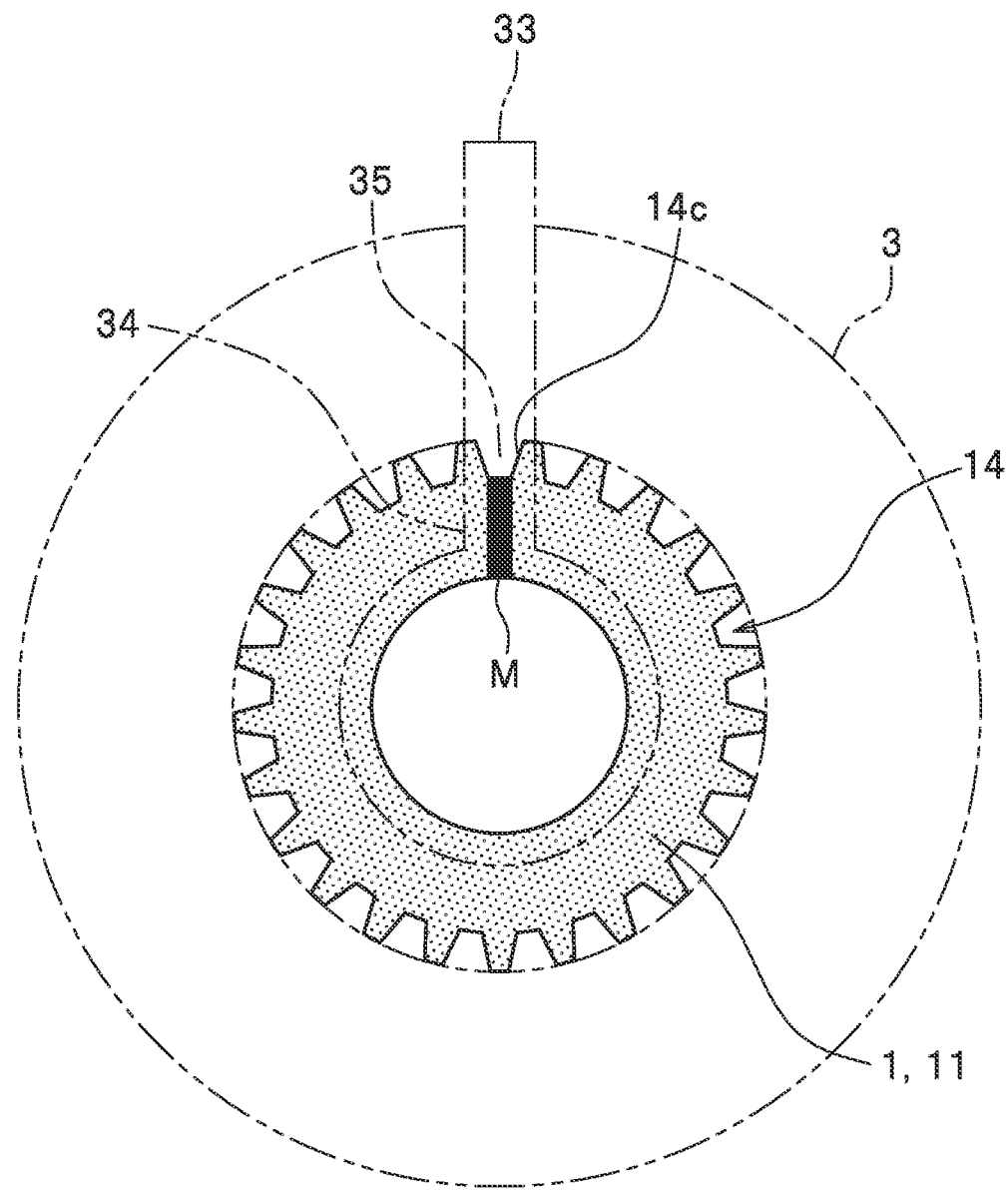
FIG. 4 is a partially enlarged top view of the pinion shaft (tubular member), as viewed from a direction indicated by an open arrow IV in FIG. 3.

FIG. 4 is a partially enlarged top view of the upper end surface of the tubular member 11 having the mark M scribed therein. Note that the positioning clip 3, having a rotational phase thereof aligned with that of the hatched tubular member 11, is indicated by phantom lines (chain double-dotted lines) in FIG. 4. As shown in FIG. 4, the mark M is scribed in the upper end surface of the tubular member 11, as a guide in the form of a line extending in the radial direction of the tubular member 11. The mark M is a guide to indicate a predetermined circumferential location of the positioning clip 3 with respect to the tubular member 11. In particular, the mark M is formed to extend in the radial direction of the tubular member 11 toward a valley 14c of the spline 14.

Note that a shape of the mark M in FIGS. 3 and 4 is exaggerated for the purpose of illustration, and is not limited in thickness and length as far as the mark M is in the form of a line such that an extension direction can be determined. Incidentally, the mark M of the present embodiment is assumed to be scribed, but may be hand-drawn with a marker pen, may be a marker seal affixed to the upper end surface of the tubular member 11, or the like.

For the mark M as described above, the positioning clip 3 is attached to the tubular member 11 such that the arm portion 34, of the joint engagement portion 33 and arm portion 34 of the positioning clip 3, which are linearly joined in a top view with each other, is aligned with the mark M. At this time, the spline-fit portion 35 of the positioning clip 3 is fitted into the valley 14c of the spline 14, located at a radially outer end of the linear mark M, for engagement.

This causes the positioning clip 3 to be unambiguously attached to the pinion shaft 1 (tubular member 11) in a neutral position as described above, at a predetermined rotational phase. That is, the positioning clip 3 is unambiguously attached at a rotational phase of the joint engagement portion 33 being fitted into the slit 29 of the joint portion 21 (lower cylinder 27) in FIG. 3, which is joined to the driving wheel (not shown) in a neutral position. Then, the inserted portion 32 of the positioning clip 3 is inserted into the hollow portion 16 of the tubular member 11 through the opening 17, to seal a gap between the inserted portion 32 and the tubular member 11.

Next in the assembling method, the joint portion 21 is attached to the pinion shaft 1 (tubular member 11) having the positioning clip 3 attached thereto, as shown in FIG. 2. In particular, the spline 14 of the tubular member 11 is fitted into the spline 28 of the joint portion 21 (lower cylinder 27) such that the joint engagement portion 33 of the positioning clip 3 is fitted into the slit 29 and between the pair of facing-each-other walls 29a, as shown in FIG. 3.

This causes the driving wheel (not shown) in a neutral position to be associated with the steering wheels (not shown) in neutral positions. The bolt B in FIG. 3 is fastened so as to hold the joint engagement portion 33 between the pair of facing-each-other walls 29a, and faces the circumferential groove 15 of the tubular member 11, as shown in FIG. 2, to prevent the tubular member 11 from moving away from the lower cylinder 27. This completes a series of steps in the assembling method of the steering device A according to the present embodiment.

Advantageous Effects

Next, a description is given of advantageous effects of the steering device A according to the present embodiment. The steering device A of the present embodiment has the upper end of the torsion bar 12 axially further away from the joint 21 than the upper end of the tubular member 11. This allows the torsion bar 12 to be shortened than a conventional one, to have a vehicle body reduced in weight.

In addition, the steering device A having the torsion bar 12 shortened results in that the pinion shaft 1 has the head 12a not protruding, at the upper end thereof, for supporting the upper end of the positioning clip 3, and this is different from a conventional steering device (see Patent Document 1, for example). This could have caused the positioning clip 3 to have insufficient strength at the upper end thereof for supporting the pinion shaft 1, but the steering device A has the inserted portion 32 (inserted body 36), located at the upper end of the positioning clip 3, inserted into the hollow portion 16 through the opening 17 of the tubular member 11. This allows the steering device A to sufficiently increase strength of the upper end of the positioning clip 3 for supporting the pinion shaft 1.

Further, the steering device A has the head 12*a* not protruding at the upper end of the pinion shaft 1, and is formed to have the opening 17 of the hollow portion 16 at the upper end of the tubular member 11. This could have caused the steering device A to have a risk of being rusted due to water entering into the hollow portion 16 of the tubular member 11, but the steering device A has the opening 17 sealed by the inserted portion 32 (inserted body 36). This prevents the tubular member 11 of the steering device A from being rusted inside.

Still further, the steering device A has the mark M provided on the upper end surface of the tubular member 11 to indicate the circumferential location for the positioning clip 3, and the positioning clip 3 is placed to the mark M. According to the steering device A as described above, placing the positioning clip 3 to the mark M allows for easily aligning a rotational phase of the positioning clip 3 with respect to the pinion shaft 1.

Still further, the steering device A has the positioning clip 3 including the joint engagement portion 33 to engage with the joint portion 21, and the arm portion 34 connecting the inserted portion 32 (flange 37) with the joint engagement portion 33. Here, the arm portion 34 is arranged so as to be aligned with the mark M. According to the steering device A as described above, the positioning clip 3 is positioned to the mark M by way of the arm portion 34, to allow for easily aligning a rotational phase of the positioning clip 3 with respect to the pinion shaft 1.

Still further, the steering device A has the joint engagement portion 33 and the arm portion 34 linearly joined with each other, in a top view as viewed in an axial direction of the tubular member 11. According to the steering device A as described above, the mark M is scribed in the upper end surface of the tubular member 11 so that the mark M is located on an extension of the joint engagement portion 33 when the joint engagement portion 33 is placed at a predetermined rotational phase with respect to the pinion shaft 1. This allows a worker to intuitively form the linear mark M on the upper end surface of the tubular member 11.

Still further, the steering device A has the mark M formed in the upper end surface of the tubular member 11 so as to extend in a radial direction of the tubular member 11 toward the valley 14*c* of the spline 14. According to the steering device A as described above, the valley 14*c* of the spline 14 to be engaged with the spline-fit portion 35 is indicated by an end of the mark M, to allow for more easily and accurately aligning a rotational phase of the positioning clip 3 with respect to the pinion shaft 1 (tubular member 11). According to the steering device A having the mark M as described above, the mark M can be formed so as to be oriented toward the valley 14*c* of the tubular member 14, to be actually engaged with the spline-fit portion 35, to allow a worker to form the mark M more intuitively in the upper end surface of the tubular member 11, as compared with a case of the mark M being formed without any destination.

Hereinabove, the embodiment of the present invention has been described, but the present invention is not limited thereto and various modifications are possible. The mark M scribed in the tubular member 11 in the steering device A of the present embodiment is assumed to be hand-drawn in the upper end surface of the tubular member 11 by a worker executing the assembling method, when the worker attaches the positioning clip 3 to the tubular member 11. However, the mark M may preliminarily be scribed in the upper end surface of the tubular member 11 before the assembling method is executed.

LIST OF REFERENCE SIGNS

1: pinion shaft, 2: steering shaft, 3: positioning clip, 4: steering gear box, 11: tubular member, 12: torsion bar, 14: spline of tubular member, 14*c*: valley of spline, 21: joint portion, 32: inserted portion, 33: joint engagement portion, 34: arm portion, 35: spline-fit portion, and M: mark.

What is claimed is:

1. A vehicle steering device comprising:
    a pinion shaft provided in a steering gear box;
    a joint portion of a steering shaft coupled with the pinion shaft; and
    a positioning clip configured to align the pinion shaft with the joint portion,
    wherein the pinion shaft includes a torsion bar and a tubular member having the torsion bar inserted thereinto,
    an upper end of the torsion bar is axially further away from the joint portion than an upper end of the tubular member,
    the positioning clip includes an inserted portion inserted into the tubular member, leaving an empty space between the torsion bar and the inserted portion within the tubular member, and
    a gap between the inserted portion and the tubular member is sealed.

2. The vehicle steering device according to claim 1, wherein
    a mark is provided in an upper end surface of the tubular member, to indicate a predetermined circumferential location for the positioning clip with respect to the tubular member, and
    the positioning clip is placed to the mark.

3. The vehicle steering device according to claim 2, wherein
    the positioning clip includes a joint engagement portion to engage with the joint portion, and an arm portion connecting the inserted portion with the joint engagement portion, and
    the arm portion is arranged so as to be aligned with the mark.

4. The vehicle steering device according to claim 3, wherein
    the joint engagement portion and the arm portion are linearly joined with each other, in a top view of the positioning clip as viewed in an axial direction of the tubular member.

5. The vehicle steering device according to claim 2, wherein
    the tubular member is provided with a spline configured to engage with the joint portion,
    the positioning clip is provided with a spline-fit portion configured to engage with the spline, and
    the mark is formed in the upper end surface of the tubular member so as to extend in a radial direction of the tubular member toward a valley of the spline.

6. An assembling method of the vehicle steering device according to claim 1, comprising:
    aligning a rotational phase of the positioning clip about an axis of the pinion shaft by placing the positioning clip to a mark formed in an upper end surface of the tubular member; and engaging the positioning clip with the tubular member after the aligning.

* * * * *